(12) United States Patent
Spector et al.

(10) Patent No.: US 11,544,779 B2
(45) Date of Patent: Jan. 3, 2023

(54) SYSTEMS AND METHODS FOR DIGITAL IDENTITY VERIFICATION

(71) Applicant: JPMORGAN CHASE BANK, N.A., New York, NY (US)

(72) Inventors: Howard Spector, Woolwich, NJ (US); Jasbir Banga, Swedesboro, NJ (US); Allison Beer, Bronxville, NY (US); Meena Pinto, Chadds Ford, PA (US); Michael S. Hartman, Wilmington, DE (US); Dennis Bowers, Middletown, DE (US); Pio Abate, Mullica Hill, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/888,467

(22) Filed: May 29, 2020

(65) Prior Publication Data
US 2020/0380598 A1    Dec. 3, 2020

Related U.S. Application Data

(60) Provisional application No. 62/854,825, filed on May 30, 2019.

(51) Int. Cl.
*G06Q 40/02*    (2012.01)
*G06N 20/00*    (2019.01)
(Continued)

(52) U.S. Cl.
CPC ............. *G06Q 40/02* (2013.01); *G06N 20/00* (2019.01); *G06Q 20/3227* (2013.01);
(Continued)

(58) Field of Classification Search
None
See application file for complete search history.

(56) References Cited

U.S. PATENT DOCUMENTS

| | | | |
|---|---|---|---|
| 9,342,741 B2* | 5/2016 | Amtrup | G06Q 10/10 |
| 10,176,542 B2* | 1/2019 | Malhotra | G06Q 20/3821 |

(Continued)

FOREIGN PATENT DOCUMENTS

| | | | | |
|---|---|---|---|---|
| AU | 2017100646 | | 7/2017 | |
| ES | 2811249 T3 * | 3/2021 | | G06F 16/93 |

(Continued)

OTHER PUBLICATIONS

Hua, et al., "A Brief Review of Machine Learning and its Application", 2009, Information Engineering Institute Capital Normal University, entire document pertinent (Year: 2009).*

(Continued)

*Primary Examiner* — Paul S Schwarzenberg
(74) *Attorney, Agent, or Firm* — Greenberg Traurig LLP

(57) ABSTRACT

Systems and methods for digital identity verification are disclosed. In one embodiment, in an information processing apparatus comprising at least one computer processor, a method for digital identify verification may include: (1) receiving, from a user electronic device or at a website, an image of an identity document for a user, the identity document comprising an image of the user; (2) processing the identity document with at least one business-specific rule; (3) extracting identity information from the identity document; (4) determining a match rate of the image of the user on the identity document to a captured image; (5) assigning a verification score to the user based on extracted identity information and the match rate; and (6) publishing the verification score to at least one system.

3 Claims, 8 Drawing Sheets

(51) Int. Cl.
*G06Q 20/32* (2012.01)
*G06Q 20/40* (2012.01)
*G06V 30/40* (2022.01)

(52) U.S. Cl.
CPC ..... *G06Q 20/4014* (2013.01); *G06Q 20/4097* (2013.01); *G06V 30/40* (2022.01)

(56) References Cited

U.S. PATENT DOCUMENTS

| | | | | |
|---|---|---|---|---|
| 10,225,248 | B2* | 3/2019 | Nigram | H04L 9/0866 |
| 2003/0217014 | A1* | 11/2003 | Mollett | G06Q 20/401 |
| | | | | 705/75 |
| 2010/0070405 | A1* | 3/2010 | Joa | G06Q 20/20 |
| | | | | 705/40 |
| 2012/0143760 | A1* | 6/2012 | Abulafia | G06Q 20/409 |
| | | | | 235/380 |
| 2015/0106265 | A1* | 4/2015 | Stubblefield | G06Q 20/4016 |
| | | | | 705/325 |

FOREIGN PATENT DOCUMENTS

| | | |
|---|---|---|
| JP | 2006140543 A * | 6/2006 |
| WO | 2016131083 | 8/2016 |
| WO | WO-2016131083 A1 * | 8/2016 |
| WO | 2018049234 | 3/2018 |

OTHER PUBLICATIONS

Thales, "Digital Identity Trends—5 Forces that are Shaping 2022", 2021, Tales Group, entire document, (https://www.thalesgroup.com/en/markets/digital-identity-and-security/government/identity/digital-identity-services/trends) (Year: 2021).*
JP-2006140543-A machine translation (Year: 2006).*
Knott, Francis, What is Private Key Encryption?, Apr. 12, 2013 Blog, entire document pertinent, retrieved from the internet at https: https://koolspan.com/private-key-encryption/ (Year: 2013).*
Partial International Search Report, dated Sep. 2, 2020, from corresponding International Application No. PCT/US2020/035392.

* cited by examiner

SYSTEMS AND METHODS FOR DIGITAL IDENTITY VERIFICATION

RELATED APPLICATIONS

This application claims priority to, and the benefit of, U.S. Provisional Patent Application Ser. No. 62/854,825, filed May 30, 2019, the disclosure of which is hereby incorporated, by reference, in its entirety.

BACKGROUND OF THE INVENTION

1. Field of the Invention

Embodiments are generally directed to systems and methods for digital identity verification.

2. Description of the Related Art

It is difficult for customers to open new accounts with different institutions and entities (e.g., banks and merchants). When customers do open these new accounts between different institutions and entities, they often lose all of the data from previous accounts they had so they have to start from scratch and recreate such information as all past data, account preferences, and personalization. Thus, customers cannot leverage their data across different accounts. This prevents customers from making informed decisions and also results in them missing out on possible benefits.

It is also difficult for customers to complete such account openings between different institutions and entities as the capabilities are limited or nonexistent for customers to view, use, understand, and control their data, across different institutions.

SUMMARY OF THE INVENTION

Systems and methods for digital identity verification are disclosed. In one embodiment, in an information processing apparatus comprising at least one computer processor, a method for digital identify verification may include: (1) receiving, from a user electronic device or at a website, an image of an identity document for a user, the identity document comprising an image of the user; (2) processing the identity document with at least one business-specific rule; (3) extracting identity information from the identity document; (4) determining a match rate of the image of the user on the identity document to a captured image; (5) assigning a verification score to the user based on extracted identity information and the match rate; and (6) publishing the verification score to at least one system.

In one embodiment, identity document may include a driver's license, a passport, etc. The identity information may include a name, an address, a date of birth, an expiration date, etc.

In one embodiment, the identity information may be identified based on machine learning.

In one embodiment, the method may further include receiving, from a third party, a risk score based on activity involving a phone number associated with the user, and the verification score may be further based on the risk score.

According to another embodiment, in a backend for a financial institution comprising at least one computer processor, a method for account opening via a third-party website may include: (1) receiving, from a third-party information processing apparatus, a request for a session with the third-party information processing apparatus; (2) opening the session with the third-party information processing apparatus; (3) identifying a plurality of user data fields in an account opening form for the third party, wherein the plurality of user data fields are identified using machine learning; (4) retrieving user information for the user data fields; (5) providing the retrieved user information to the identified user data fields; and (6) submitting the account opening form to the third-party information processing apparatus.

In one embodiment, the session may be requested based on the selection of a create account option on a website hosted by the third-party information processing apparatus, based on the user scanning a machine-readable code or tapping a NFC tag with a mobile electronic device, etc.

According to another embodiment, a method for carrier verification of user identification may include: (1) a computer program or browser executed by a mobile electronic device receiving a request to open an account with an entity; (2) the computer program or browser receiving user information comprising a user name, a user address, and a user phone number; (3) the computer program or browser requesting a unique URL and session identifier from a carrier server that provides data service for the mobile electronic device; (4) the computer program or browser rendering a page comprising the session identifier and the URL; (5) in response to the rendering, the computer program or browser contacting the carrier server using the URL and providing the session identifier, wherein the carrier server associates the electronic device with the session identifier; (6) the computer program or browser invoking a match procedure with the carrier server and providing the user information received from the user, wherein the carrier generates a match score for the user information against registered user information registered to the mobile electronic device; and (7) the computer program or browser receiving the match score from the carrier server.

In one embodiment, the URL may be a EVURL.

In one embodiment, a single match score may be provided for the user information.

In one embodiment, a separate match score may be provided for each of the user name, the user address, and the user phone number.

In one embodiment, the application may be for a financial account, and the entity may be a financial institution.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are generally directed to systems and methods for digital identity verification. In one embodiment, the processes described herein may be performed, for example, by a backend for a financial institution. A customer may access the process on an electronic device (e.g., computer, smart phone, smart watch, Internet of Things (IoT) appliance, a kiosk (e.g., ATM), a point-of-sale device, etc.

In one embodiment, a digital account opening (DAO) engine may approve a customer using a financial institution's computer application (e.g., a mobile computer application) for a credit account. In one embodiment, once opened, transactions may be posted and/or presented to the new account.

In one embodiment, a risk profile for the customer that is based on customer/business interactions with the company may be applied, and a score or other mechanism to assist in decisions the customer may be generated and/or provided.

In one embodiment, identification, such as a driver's license, may be received by the computer application by taking an image of the driver's license and performing any necessary optical character recognition, etc. In one embodiment, machine learning may be used to identify the meanings of different fields in different licenses.

In one embodiment, the image data may be captured by a front end (e.g., an electronic device) and processed by, for example, a back end. Images captured may include the front/back of a driver's license, pages from a passport, and images of the person using the device. The data returned from processing may include information extracted from the document, such as name, address, date of birth, document number, document type, issue date, etc. It may further include information about the validity of the document (e.g., the issue date for the format of the document), verification of document characteristics (e.g., the presence of a watermark), etc. If a photo of the individual was provided, a validity check may be performed to determine whether what was provided is likely of a live person or a photo. A match rate of the photo versus the identity document provided may be provided Embodiments may use a SDK for Android/iOS applications, an HTML 5 JavaScript component for the web, etc. that allows capturing of the relevant images and a certain amount of image processing/validation.

In one embodiment, business units within a financial institution may have an interest in knowing the verification of the identity document, and may receive confirmation of the user's identity. Example systems include know your customer systems, account opening systems, etc.

Figure 1:
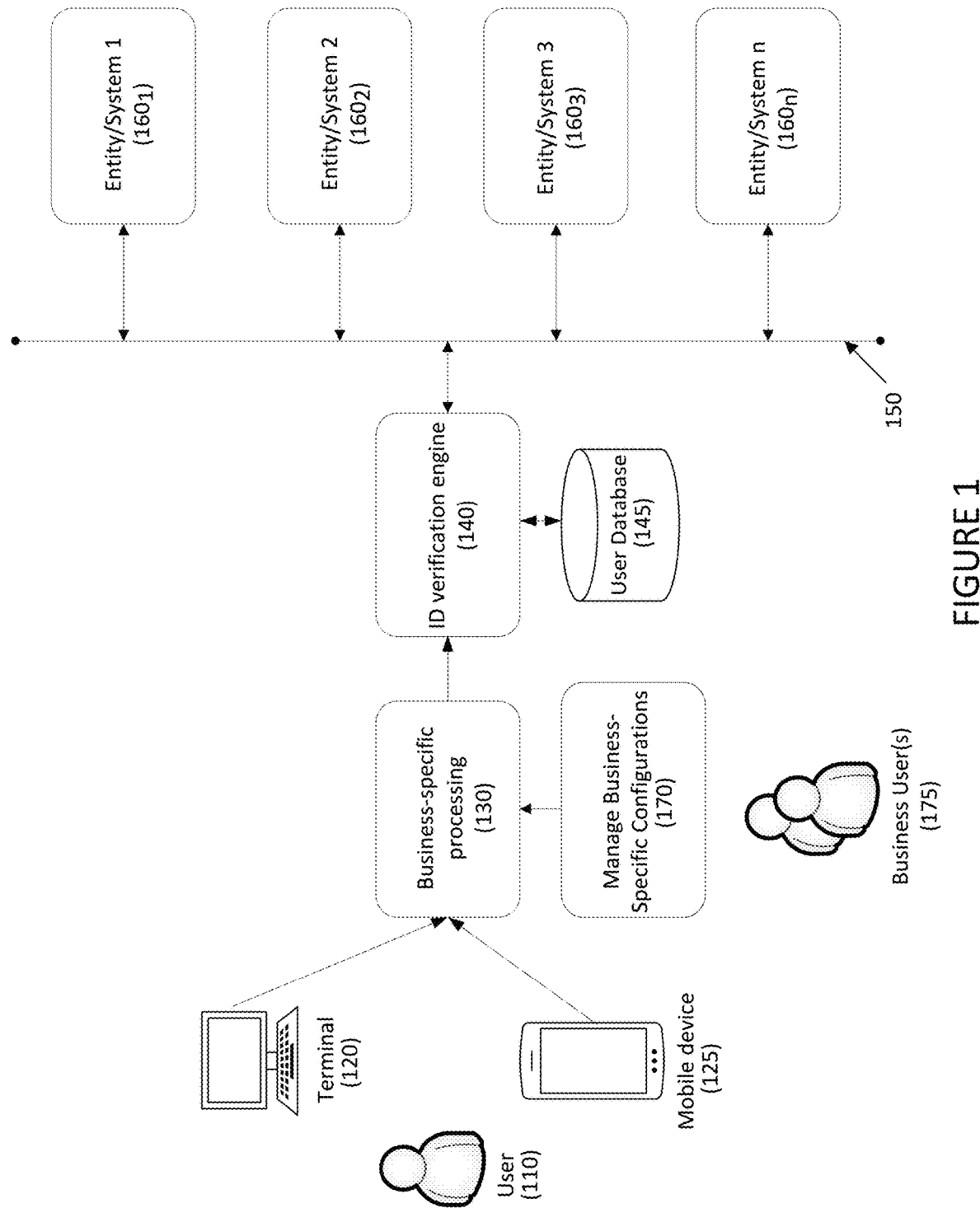
FIG. 1 depicts a system for digital identity verification according to one embodiment.

Referring to FIG. 1, a system for digital identity verification is provided according to one embodiment. System 100 may include user 110, who may access terminal 120 and/or mobile electronic device 125. In one embodiment, user 110 may use terminal 120 and/or mobile electronic device 125 to capture an image of an identity document, such as a driver's license, a passport, etc., and an image of the user. Other information may be captured as is necessary and/or desired.

System 100 may further include business-specific processing 130, which may process the data received from terminal 120 and/or mobile electronic device 125. The specific business-specific processing 130 may be based on the type of application being processed, and additional data may be required. Business-specific processing 130 may also be based on business and/or regulator demand. In one embodiment, machine learning may be used to determine if other data sources should be retrieved. For example, a customer may provide a name, address, social security number, and other contact information, and this information may be augmented with information received in interactions with business partners, such as electronic wallet partners, mobile network operators, etc. This additional information may be used to assist in decisioning and/or to present the information to the customer for validation.

Business-specific processing 130 may be enabled using configuration, or call-back hooks (e.g., restful, SOAP, other services, etc.). These "hooks" may be pre-processing hooks, post-processing hooks, and/or core processing hooks. Each business unit (e.g., business unit X, business unit Y) may This may also be compiled in logic that may be triggered based on a product configuration.

System 110 may further include identification verification engine 140, which may receive the processed data and may compare the data to stored data for the user in user database 145. Identification verification engine 140 may extract data from the identity document, such as the Identification verification engine 140 may perform a validity check to determine whether what was provided is likely of a live person or a photo, a match rate of the photo versus the identity document, etc. In one embodiment, identification verification engine 140 may make decisions based on existing logic, machine learning, and/or other algorithms if additional validation checks are necessary. In one embodiment, identification verification engine 140 may interact with business partners (e.g., mobile wallet providers, mobile network operators, etc.) for such validation.

For example, the customer's phone number may be checked against data on file for an electronic wallet partner to see the phone number matches. This may be done anonymously, by allowing selected user data to be hashed and then that hashed value sent to the partner that has a store of hashes and can match or decline the data.

In one embodiment, identity verification engine 140 may write identify verifications on event bus 150.

System 100 may further include one or more entity/system 160 that may receive identity verification from identity verification engine 140. Examples of entities/systems 160 may include know your customer systems, account opening system, etc.

In one embodiment, one or more entity/system 160 may be external to the organization doing the identity verification; thus, identity verification may be provided as a service to one or more external entity/system 160.

In one embodiment, one or more business user 175 may provide or manage business-specific configurations 170, such as pre-, post- or core processing to allow for dynamic flexibility based on individual products. Business-specific configurations 170 may be combined or aggregated based on configuration or dynamically based on machine learning based on, for example, fraud and/or reject rates.

Figure 2:
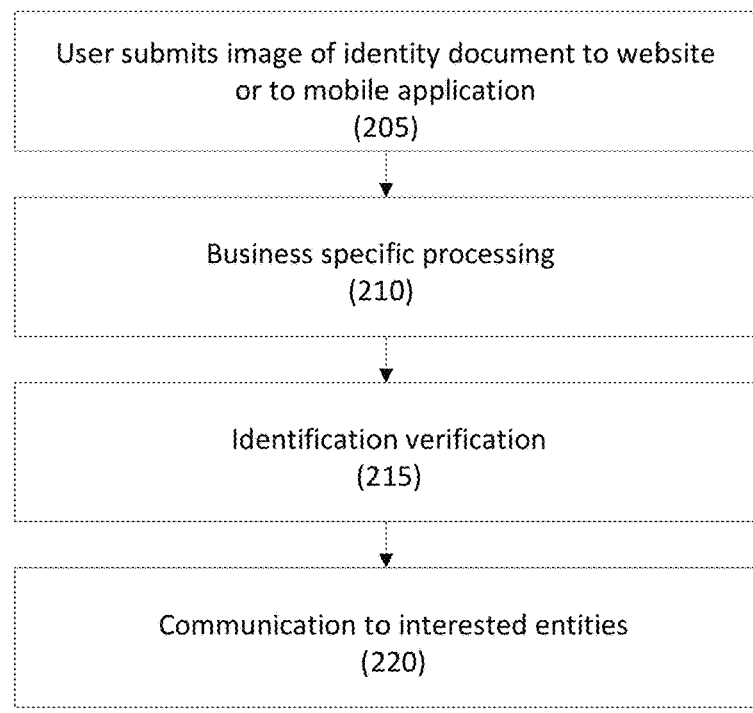
FIG. 2 depicts a method for digital identity verification according to one embodiment.

Referring to FIG. 2, a method for digital identity verification is provided according to one embodiment.

In step 205, a user may submit an image of an identity document to a website, a mobile application executed on a mobile electronic device, etc. Examples of identity documents include driver's licenses, passports, etc. Other information, such as a picture of the user, additional documents (e.g., utility bills, social security cards, etc.), etc. may be captured as well. The documents may be dynamically retrieved from business partners, such as electronic wallet partners, mobile network operators, etc.

For example, the user may submit the identity document as a part an account opening process.

In step 210, the captured information may be processed according to business-specific rules. The business-specific rules may depend on the type of application being processed, and machine learning may be used to identify additional data sources, etc.

In one embodiment, multi-factor authentication may be used to authentication customers using unknown devices. For example, an existing customer may choose digital account opening to apply from a device that is unknown to the financial institution's backend. The system may then send a one-time passcode (OTP) to a known customer contact (e.g., a registered device). The customer may then receive the OTP, and may enter the OTP on a verification screen. The system may then verify the OTP is correct, and allow the customer to continue with the process.

In step 215, the identity document may be verified. In one embodiment, information may be extracted from the identity document. Examples of information that may be extracted include name, address, date of birth, driver's license number, issue date, expiration date, etc. In one embodiment, machine learning may be used to identify the fields on the identity document as different types of identity documents may use different formats.

In one embodiment, the image captured of the user may be compared to the image on the identity document, and a match rate, or a confidence that the image captured is the same as the person on the identity document, may be calculated. In one embodiment, optical character recognition may be used; in another embodiment, a trained machine learning algorithm may be used to assess the validity of the image or documents provided.

In one embodiment, multiple systems may provide scores. A risk engine may select one of the scores, weight the different scores, etc., resulting in a single score that may be used for account opening.

In one embodiment, the digital account opening process may use a single score that may be aggregated from various risk engines and scores to determine the customer's eligibility for a product.

In one embodiment, scores may be dynamically received from business partners based on information provided by the customer. For example, a business partner may provide a risk/fraud score based on a given phone number's activity.

In step 220, the identity verification may be published to entities and/or systems. For example, the identity verification may be put on a bus, a distributed ledger, etc. for the entities or systems to use. Example systems include digital account opening systems, know your customer systems, etc.

In one embodiment, entities or systems may be external to the organization doing the identity verification and may provide identity verification as a service to external entities and systems.

In one embodiment, the customer may use a "save and continue" feature, where the customer may start an application on one device, such as a smartphone, computer, kiosk, ATM, etc., and may save his or her progress and may continue the application on a different device. For example, the customer may start an application at a financial institution using a kiosk, computer, etc. and complete the application at home once any necessary documents have been retrieved.

In one embodiment, a machine-readable code (e.g., a QR code) or other code may be used to identify the application for the customer.

In one embodiment, the digital account opening system may generate the machine-readable when an application is saved. The machine-readable code may include, for example, an identifier for the application and any other supporting information needed to uniquely identify the application and applicant. The machine-readable code may be presented to the customer, and the customer may be provided an option to send the machine-readable code to a co-applicant (e.g., as an image). At later point, when the co-application receives the machine-readable code, the co-applicant may continue the digital account opening process by, for example, scanning the machine-readable code, and the co-applicant will be taken to the right spot in the application process to begin/continue the application.

In one embodiment, the save and continue feature may be used by joint applicants so that a first applicant may complete that person's part of the application, and may then save the application. The second applicant may access the application, complete his or her part, and submit the application.

In one embodiment, this feature may allow the customer to save and manage the application before it is finally submitted for processing. For example, for customers that are new to the financial institution or without an online account, this provides the ability to resume applications without an account. For existing customers, this provides the ability to resume applications by logging in to the customer's account.

Figure 3:
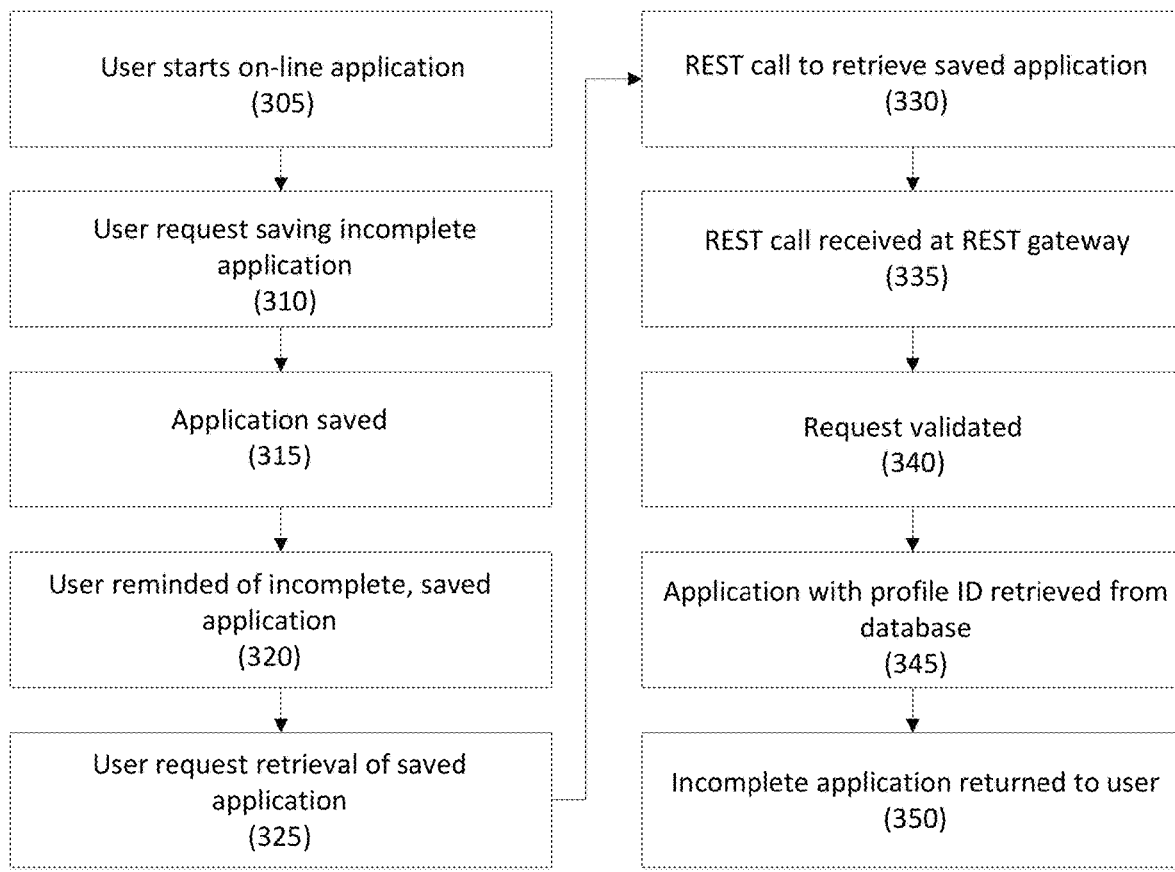
FIG. 3 depicts a method for saving and resuming an application for a digital account opening process according to one embodiment.

Referring to FIG. 3, a method for saving and resuming an application for a digital account opening process is provided according to one embodiment.

In step 305, a user may start an on-line application. For example, the application may be completed as part of a digital account opening process that may include multiple sections, such as affiliations, finances, beneficiaries, funding, legal, and submission.

In step 310, before the application is complete, the user may save the incomplete application. In one embodiment, the incomplete application may be saved at any point of the process; in another embodiment, the incomplete application will be saved at the last completed section.

In step 315, the incomplete application may be saved. In one embodiment, the application may be saved with an identifier, and the identifier may be provided to the customer for later use. Examples of identifiers include alpha-numeric codes, a phone number, a machine-readable code (e.g., QR code), etc.

In one embodiment, device fingerprinting may be used. For example, when a customer successfully authenticates on a new device using multi-factor authentication, the backend may gather attributes about the customer device, and may establish a device fingerprint. If a device fingerprint is already established, the backend may retrieve that device fingerprint based on the attributes. The backend may then associate the device fingerprint with the customer record. At later time, if the customer uses the same device to apply for a product using the digital account opening process, the customer's device fingerprint may be leveraged in the authentication process to avoid some or all authentication steps, such as the use of multi-factor authentication.

In step 320, the user may be reminded of the incomplete, saved application periodically. This may be by text message, email, in-app messaging, etc.

In step 325, the user may request retrieval of the saved, incomplete application. In one embodiment, the user may provide the identifier as part of the retrieval process.

In step 330, a REST call may be made to retrieve the saved, incomplete application.

In step 335, a REST gateway may receive the REST call, and in step 340, the request may be validated. In one embodiment, validation may include checking security aspects of the request to make sure it is not fraudulent, making sure the users session is still valid, looking at the data fields provided to ensure they are of the expected type and form, etc. Machine learning may be used to help identify and any out of pattern responses.

In step 345, the identifier may be used to retrieve the saved, incomplete application. In step 250, the saved, incomplete application may be retrieved, and the user may continue to complete the application. In one embodiment, augmented data based on what the customer has already entered may be provided to assist with the application completion process. For example, if the customer has a relationship with the financial institution or a business partner, that information may be used to assist the customer in completing the application.

Figure 4:
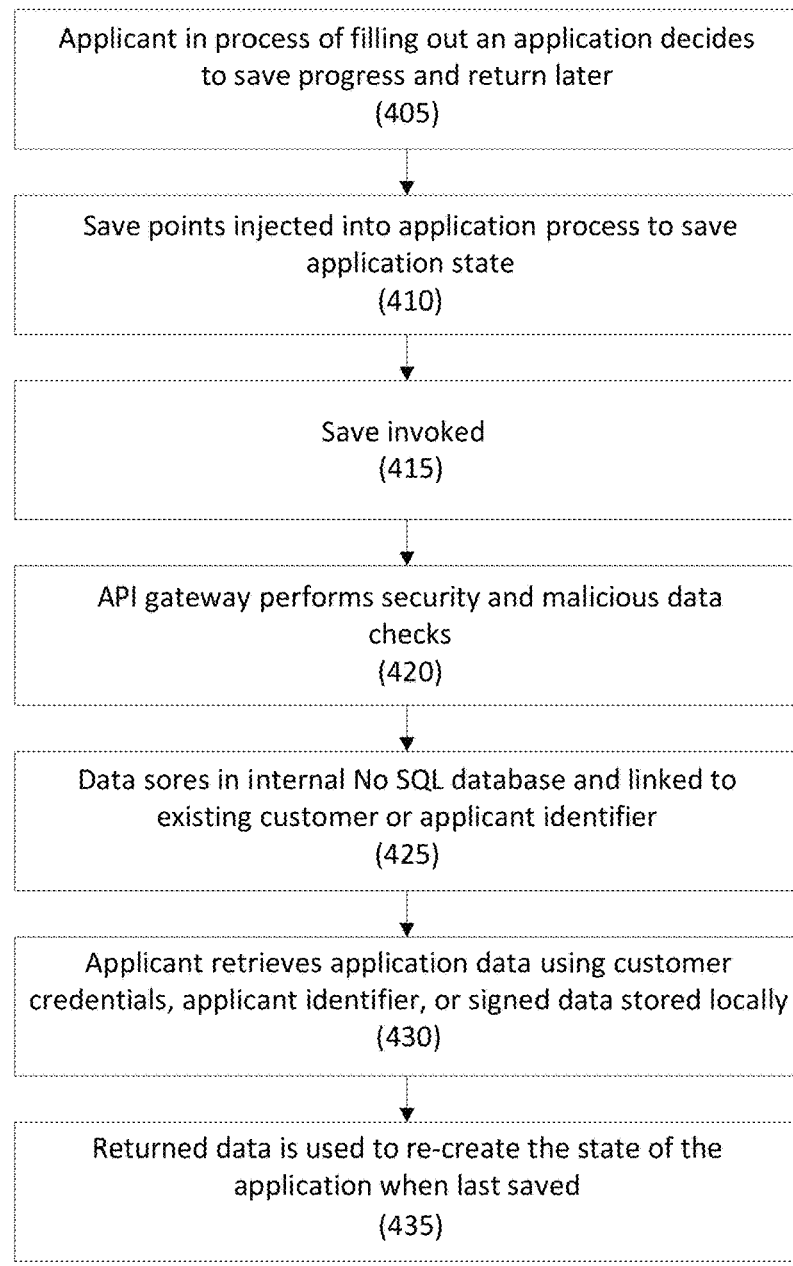
FIG. 4 depicts method for updating an incomplete application for a digital account opening process according to one embodiment.

Referring to FIG. 4, a method for updating an incomplete application for a digital account opening process is provided according to one embodiment.

In step 405, an applicant in process of filling out an application decides to save progress and return later In step 410, save points may be injected into application process to save application state. The save points may be based on a part of the application being completed, a time from the last save point, a manual save request, etc.

In step 415, a save point may be invoked using, for example, a REST invocation, and in step 420, the invocation may pass through an API gateway which performs security checks, malicious data checks, and any other checks as is necessary and/or desired.

In step 425, the application data may be stored in a database (e.g., an internal No SQL database) and associated with the applicant using, for example, an existing customer identifier, an applicant identifier, etc.

In step 430, when the applicant returns, the applicant may retrieve the application data using the applicant's customer identifier or applicant identifier.

In step 435, the returned data is used to re-create the state of the application when last saved.

In one embodiment, mobile carrier id validation may be used to match the customer identity. Information shared by carrier identity of device used by the customer may be used to match with customer-entered application info. If it matches, additional steps to validate customers may be reduced.

Figure 5:
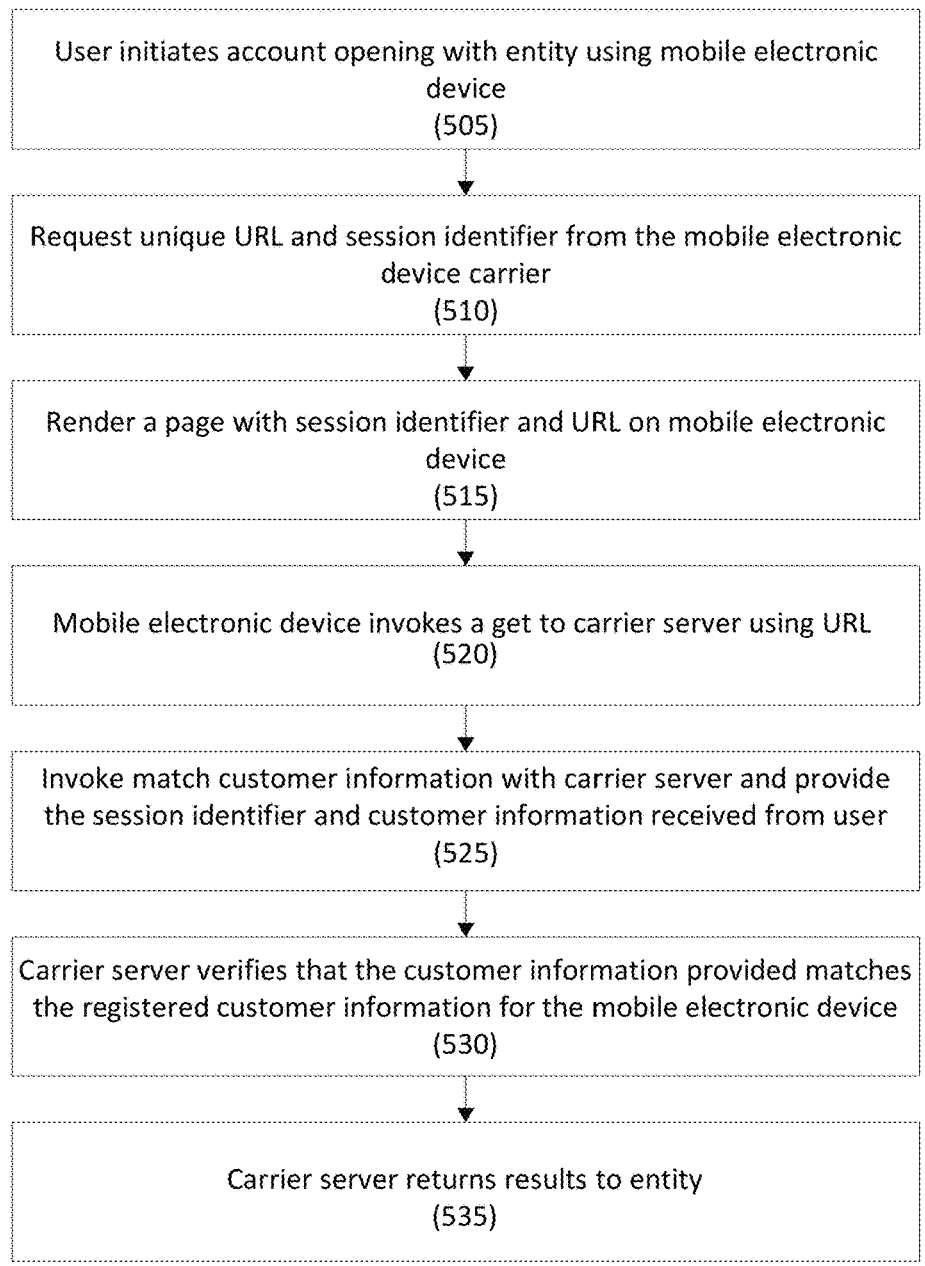
FIG. 5 depicts a method for carrier identification validation according to one embodiment.

Referring to FIG. 5, a method for carrier identification validation is provided according to one embodiment.

In step 505, a user may initiate account opening with an entity using the user's mobile electronic device. For example, the user may execute an application, browse to a website, etc. on the mobile electronic device.

In one embodiment, the user may enter the user's name, address, phone number, email address, etc. into the application or website executed by the mobile electronic device.

In step 510, the application or website executed by the mobile electronic device may request a unique URL, such as a EVURL and session id from the carrier that provides data service for the mobile electronic device. The EVURL is a unique URL for the carrier in order to identify individual requests from the mobile electronic device.

In step 515, the application or website executed by the mobile electronic device may render a page with the session identifier and the URL.

In step 520, after the page is rendered, the application or website executed by the mobile electronic device may invoke a get using the URL on the rendered page. In one embodiment, this invokes the carrier server directly from user's mobile device, and may communicate the session identifier to the carrier server. The carrier server may associate the mobile electronic device (e.g., a mobile electronic device identifier) with the session identifier.

In step 525, the application or website executed by the mobile electronic device may invoke a match customer procedure with the carrier server. The application or website executed by the mobile electronic device may provide the customer name, address, phone number, email address, etc. provided by the customer, as well as the session id to the carrier server.

In step 535, the carrier may verify the customer information matches the registered customer information for the electronic device. In one embodiment, the carrier server may use the session identifier to retrieve the customer name, address, phone number, email address, etc. that it has registered to the mobile electronic device. It may then compare the retrieved customer information to the customer information received with the session identifier in the match request. For example, the carrier may provide match scores for each of the customer name, address, phone number, email address, etc. against the information for the customer with which the device is registered. In another embodiment, it may provide a collective score.

In step 540, the carrier server may return results of the verification to the entity.

In one embodiment, the reduction in validation steps may be applied to mobile electronic devices that are part of the same plan (e.g., a family share plan).

Figure 6:
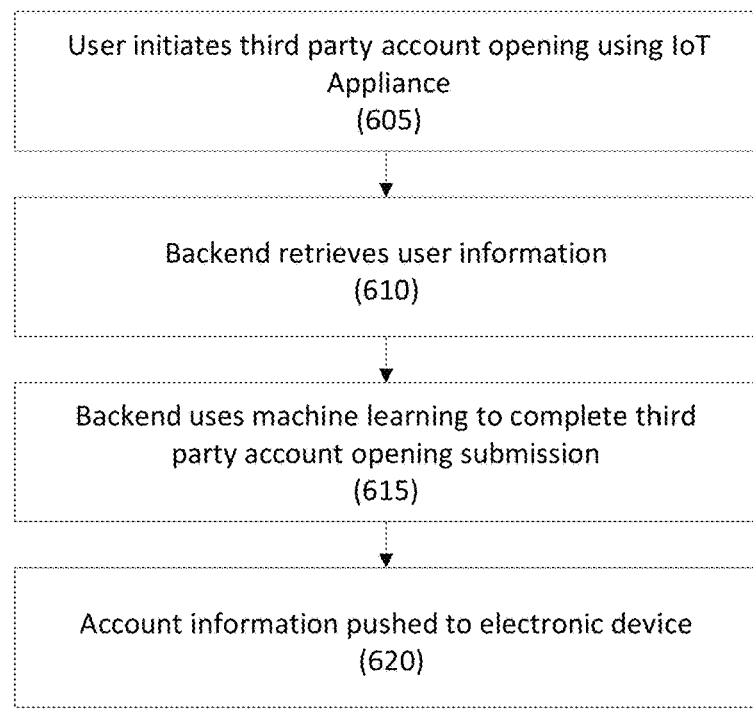
FIG. 6 depicts a method of account opening using an IoT device according to one embodiment.

Referring to FIG. 6, a method of account opening using an IoT device is provided according to one embodiment. In step 605, a user may initiate third party account opening using an IoT device. For example, the user may open an account with a partner of the financial institution. The IoT device may be any suitable IoT device, including payment systems.

In one embodiment, the user may speak a command to the IoT device to initiate account opening. In one embodiment, the spoken command may be used to authenticate the user. The command may identify the financial institution as the executor of the account opening with the third party.

In step 610, the backend for the financial institution may authenticate the user and may retrieve the user's information to assist with account opening.

In step 615, the backend may use machine learning to identify the user information to provide to the account opening form. The backend may then submit the account opening form on behalf of the customer.

In step 620, once the account is opened, account information may be pushed to the IoT device. For example, the account information may be pushed to a RF-enabled tag on a vehicle to pay tolls.

Figure 7:
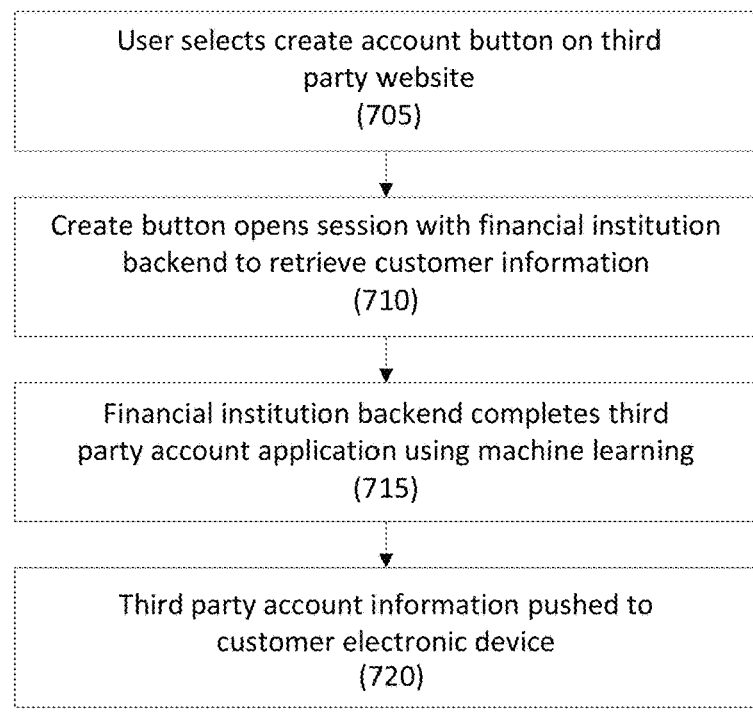
FIG. 7 depicts a method for opening an account on a third-party website according to one embodiment.

Referring to FIG. 7, a method for opening an account on a third-party website is provided according to one embodiment. In step 705, a user may select a "create account" button on the third-party website, which may interface with the financial institution.

In step 710, the button opens a session with the financial institution backend, which retrieves customer information to create the account.

In step 715, the backend may use machine learning to identify the user information to provide to the account opening form. The backend may then submit the account opening form on behalf of the customer.

In step 720, the third-party account information may be pushed to a customer electronic device, returned to the website, etc.

Figure 8:
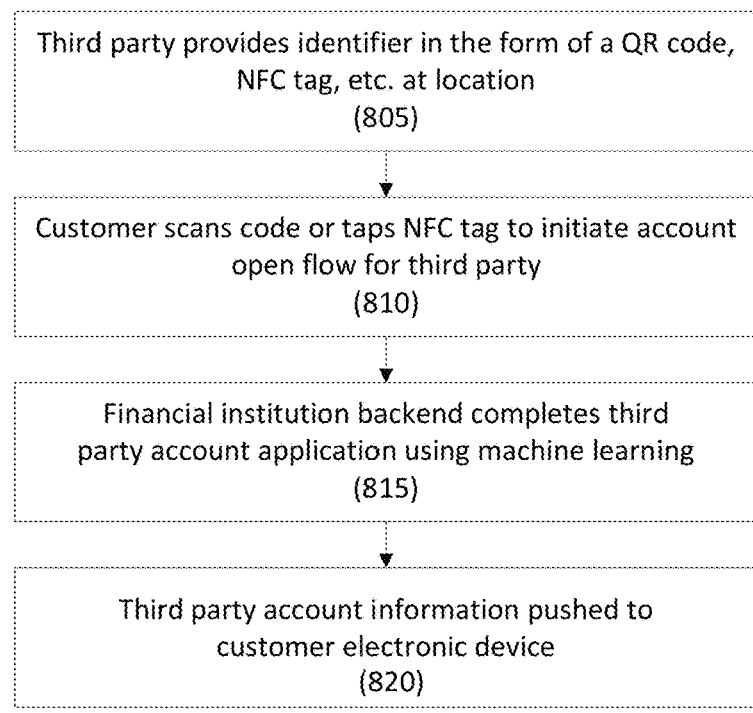
FIG. 8 depicts a method for opening an account based on a machine-readable code or NFC tag at a third-party location according to one embodiment.

Referring to FIG. 8, a method for opening an account based on a machine-readable code or NFC tag at a third-party location is provided.

In step 805, the third party may provide an identifier (e.g., machine-readable code, NFC tag, etc.) at the third-party location.

In step 810, the customer may scan the code, tap the NFC tag, etc. to initiate account opening flow for the third party. In one embodiment, this may open a session with the financial institution backend, which retrieves customer information to create the account.

In step 815, the backend may use machine learning to identify the user information to provide to the account opening form. The backend may then submit the account opening form on behalf of the customer.

In step 820, the third-party account information may be pushed to a customer electronic device.

In one embodiment, the customer may be offered pre-underwritten loans. The customer may provide minimal information to accept the loan. An example of such is disclosed in U.S. Provisional Patent Application Ser. No. 62/863,600, the disclosure of which is incorporated by reference in its entirety.

In one embodiment, a partnership with a third-party wallet may be used. For example, as part of the digital account opening application capture process, a customer may provide a phone number and credit/debit card number for a financial instrument that is stored in the customer's third-party wallet. The backend may contact the third-party wallet provider to validate the identity of the customer. If the third-party wallet provider confirms the customer's identify, the backend may reduce the number of steps in the customer identification process, and may also increase the probability of approval for product being applied for.

In one embodiment, the third-party wallet provider may provide a confidence level in the validation, such as Apple Wallet's green path for charge authorizations.

In one embodiment, trust may be extended to an aggregator. For example, if a financial institution trusts the user, the trust may be extended to a third-party aggregator, a partner, etc. Examples of such are disclosed in U.S. Patent Application Ser. No. 62/681,173, filed Jun. 6, 2018, and U.S. patent application Ser. No. 16/433,537, the disclosures of which are hereby incorporated, by reference, their entireties.

It should be noted that the names or any systems in the figures are exemplary only and the disclosure is not limited to certain brands, devices, etc.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for digital identify verification, comprising:
   receiving, by a computer program executed by an electronic device and from a user electronic device, an image of an identity document for a user, comprising an image of the user;
   processing, by the computer program, the identity document with at least one business-specific rule;
   extracting, by the computer program and using optical character recognition, identity information from the image of the identity document, wherein the identity information includes a telephone number;
   identifying, by the computer program and using a machine learning algorithm that is trained on a type of the identity document, the telephone number in the extracted identity information;
   anonymizing, by the computer program, the telephone number by generating a first hash value of the telephone number;
   sending, by the computer program the first hash value of the telephone number to a third-party electronic wallet provider, wherein the third-party electronic wallet provider is configured to generate a telephone number verification by confirming that the first hash value matches a one of a plurality of hashes of valid stored telephone numbers without identifying the telephone number or the user;
   receiving, by the computer program and from the third-party electronic wallet provider, the telephone number verification;
   receiving, by the computer program and from a system of a mobile network provider, a risk score for the telephone number, wherein the risk score for the telephone number is based on call activity associated with the telephone number;
   determining, by the computer program, a match rate of the image of the user on the identity document to a captured image;
   assigning, by the computer program, a verification score to the user based on extracted identity information, the match rate, the telephone number verification, and the risk score for the telephone number; and
   publishing, by the computer program, the verification score to at least one system.

2. The method of claim 1, wherein the identity document comprises one of a driver's license and a passport.

3. The method of claim 1, wherein the identity information comprises at least one of a name, an address, a date of birth, and an expiration date.

\* \* \* \* \*